(12) United States Patent
Takahashi et al.

(10) Patent No.: US 7,041,930 B2
(45) Date of Patent: May 9, 2006

(54) BELLOWS FOR USE IN VACUUM CAPACITOR

(75) Inventors: Eiichi Takahashi, Shizuoka (JP); Toshimasa Fukai, Shizuoka (JP); Toru Tanimizu, Ibaraki (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 11/005,482

(22) Filed: Dec. 7, 2004

(65) Prior Publication Data

US 2005/0133481 A1    Jun. 23, 2005

(30) Foreign Application Priority Data

Dec. 8, 2003    (JP)    ............................. 2003-408853

(51) Int. Cl.
*H01G 5/13* (2006.01)
(52) U.S. Cl. ...................................... 218/135; 361/279
(58) Field of Classification Search ................ 218/118, 218/135, 143, 144, 145; 361/277–279, 287, 361/290–291; 420/473, 476, 499
See application file for complete search history.

(56) References Cited

U.S. PATENT DOCUMENTS

| 6,203,931 B1 * | 3/2001 | Chu et al. ................... 428/670 |
| 6,587,328 B1 * | 7/2003 | Bigler et al. ................. 361/326 |

FOREIGN PATENT DOCUMENTS

| GB | 1195814 A | * | 6/1970 |
| JP | 06-204082 A | | 7/1994 |
| JP | 06-204083 A | | 7/1994 |
| JP | 06-204084 A | | 7/1994 |
| JP | 07-078729 A | | 3/1995 |
| JP | 08-097088 A | | 4/1996 |
| JP | 10-284347 A | | 10/1998 |
| WO | WO 200167472 A1 | * | 9/2001 |

* cited by examiner

*Primary Examiner*—Lincoln D. Donovan
*Assistant Examiner*—M. Fishman
(74) *Attorney, Agent, or Firm*—Foley & Lardner LLP

(57) ABSTRACT

A vacuum capacitor includes a vacuum vessel, stationary and movable electrodes arranged in the vacuum vessel, and a bellows which follows the movable electrode to maintain the hermeticity of the inside of the vacuum vessel and which serves as a current path, wherein the bellows is formed of a conduction high-strength heat resisting alloy.

2 Claims, 2 Drawing Sheets

BELLOWS FOR USE IN VACUUM CAPACITOR

BACKGROUND OF THE INVENTION

The present invention relates to a vacuum capacitor for various circuits such as an oscillating circuit of a super power oscillator, an RF power circuit of a semiconductor manufacturing apparatus, and a tank circuit of an induction heating apparatus, and more particularly, to a bellows for use in the vacuum capacitor.

Vacuum capacitors are broadly divided into a vacuum fixed capacitor wherein a capacitance value is fixed and a vacuum variable capacitor wherein a capacitance value can be varied.

The characteristics required of the vacuum variable capacitor are lower power loss, less heat generation during energization, longer life, and the like. As will be described hereinafter in detail, the vacuum variable capacitor comprises a bellows which follows a movable electrode to maintain the hermeticity of the inside of a vacuum vessel and which serves as a current path between a movable-electrode support plate and a movable side-end plate. Thus, the material of the bellows exerts a great influence on the required characteristics.

SUMMARY OF THE INVENTION

A power loss and heat generation at the bellows are reduced by adopting a material having higher conductivity. The material should have not only higher conductivity, but also longer life. Moreover, since the bellows is brazed at high temperature (about 700° C. or more) in a vacuum, the material should resist such high brazing temperature and show excellent strength after brazing.

It is, therefore, an object of the present invention to provide vacuum capacitor with a bellows, which allows restraint in heat generation during energization and achievement of longer life, sufficient resistance to high-temperature brazing, and excellent strength after brazing.

Generally, the present invention provides a vacuum capacitor, which comprises: a vacuum vessel; stationary and movable electrodes arranged in the vacuum vessel; and a bellows which follows the movable electrode to maintain hermeticity of an inside of the vacuum vessel, the bellows serving as a current path, the bellows being formed of a conduction high-strength heat resisting alloy.

BRIEF DESCRIPTION OF THE DRAWINGS

The other objects and features of the present invention will become apparent from the following description with reference to the accompanying drawings wherein.

DETAILED DESCRIPTION OF THE INVENTION

Figure 1:
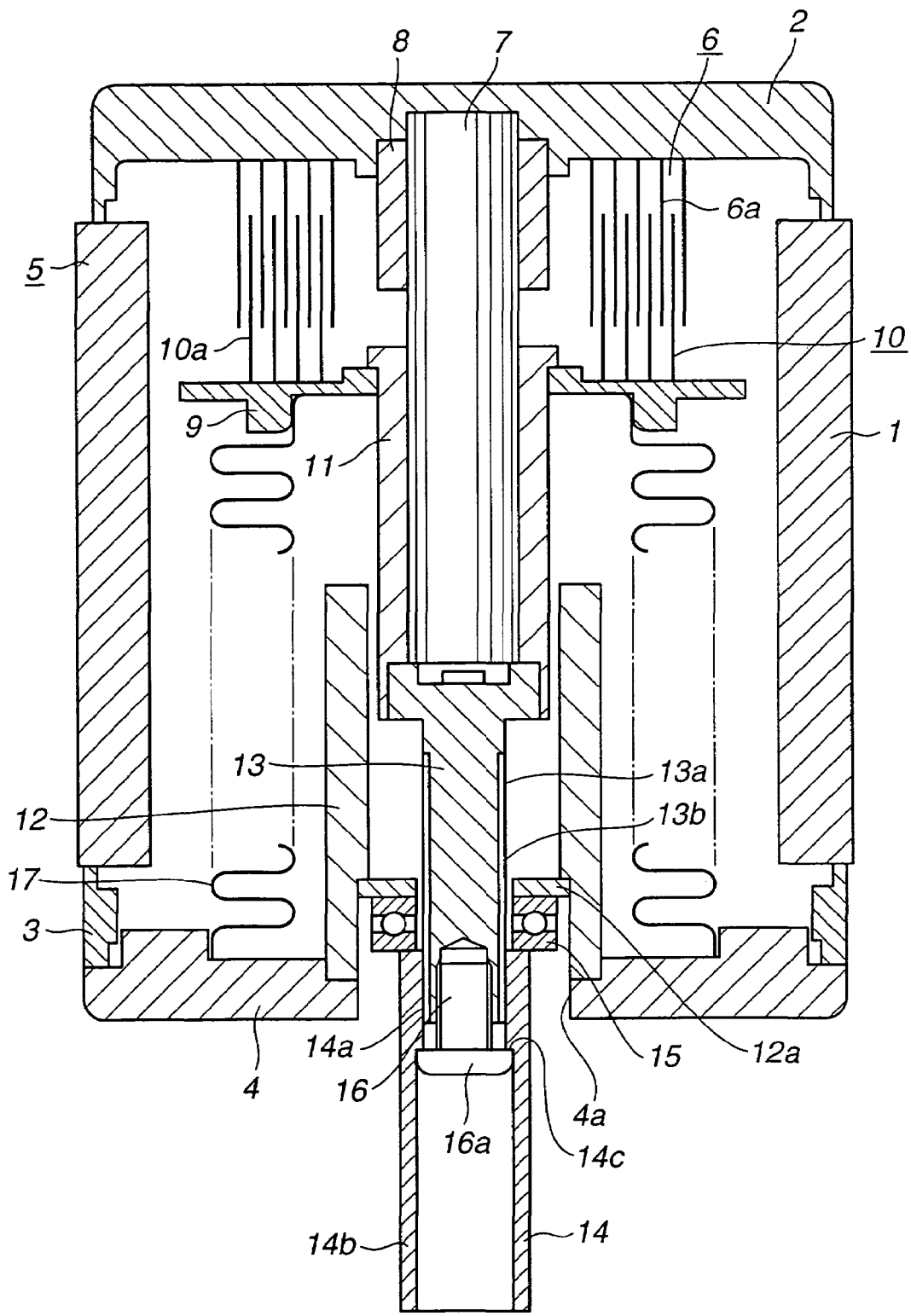
FIG. 1 is a longitudinal sectional view showing an embodiment of a vacuum capacitor with a bellows according to the present invention.

Referring to the drawings, a description will be made about a preferred embodiment of a vacuum capacitor (vacuum variable capacitor) with a bellows according to the present invention.

Referring to FIG. 1, the vacuum capacitor comprises a ceramic insulating tube 1, a stationary side-end plate 2 secured to a first end of the insulating tube 1, and a movable side-end plate 4 secured to a second end of the insulating tube 1 through a connecting tube 3, thus forming a vacuum vessel 5.

A stationary electrode 6 is comprised of a plurality of cylindrical electrode plates 6a with different diameters mounted concentrically to the inner surface of the stationary side-end plate 2. A center pin 7 is arranged in the center of the inner surface of the stationary side-end plate 2 through a stationary guide 8. A movable-electrode support plate 9 is disposed in the vacuum vessel 5 to face the stationary side-end plate 2. A movable electrode 10 is comprised of a plurality of cylindrical electrode plates 10 with different diameters mounted concentrically to the movable-electrode support plate 9 in such a way as to allow non-contact engagement and disengagement between the electrode plates 6a of the stationary electrode 6.

A cylindrical movable lead 11 is arranged through the center of the movable-electrode support plate 9 for integration therewith. The movable lead 11 is electrically isolated from the center pin 7. A hole 4a is formed in the center of the movable side-end plate 4. A heat pipe 12 is arranged at the perimeter of the hole 4a and on the inner surface of the movable side-end plate 4. A flange 12a is provided to the inner surface of the heat pipe 12 to protrude inward. An adjustment screw 13 with an external thread 13a at the outer periphery has a first end engaged with the movable lead 11 and a second end arranged through the flange 12a of the heat pipe 12. An adjustment nut 14 has a first end which is formed at the inner periphery with an internal thread 14a meshed with the external thread 13a of the adjustment screw 13, and is rotatably supported by the underside of the flange 12a through a bearing 15.

The adjustment screw 13 has a second end formed with an internal thread 13b with which a stop screw 16 is meshed. The adjustment nut 14 also has a hole 14b formed to continuously extend from the internal thread 14a and has larger diameter than a section of the internal thread 14a. A step 14c is arranged between the internal thread 14a and the hole 14b. A cylindrical bellows 17 is arranged at the outer periphery of the movable lead 11 and the heat pipe 12 to separate the vacuum side and the atmospheric side. The bellows 17 has a first end mounted to the movable-electrode support plate 9 and a second end mounted to the movable side-end plate 4, thus maintaining the inside of the vacuum vessel 5 under vacuum.

In the embodiment, when adjusting a maximum capacitance value of the vacuum capacitor, the adjustment screw 14 is slightly turned to the right (in the case that the screw 14 is a right-hand screw) before engaging the stop screw 16. Thus, the movable lead 11 is slightly moved downward with respect to the position of maximum capacitance value where a distal end of the center pin 7 abuts on an inner end of the adjustment screw 13, then achieving adjustment of a defined maximum capacitance value. This slight adjustment amount is determined to correspond to a variation in capacitance of the vacuum capacitor.

Then, the stop screw 16 is meshed with the internal thread 13b of the adjustment screw 13 until a head 16a abuts on the step 14c of the adjustment nut 14. The stop screw 16 is fixed to the adjustment screw 13 by an adhesive and the like. The stop screw 16 and the adjustment nut 14 are not bonded to each other. This restrains an upward position of the adjustment screw 13, so that even when trying to turn the adjustment nut 14 to the left with respect to the position of maximum capacitance value, its turning cannot be obtained due to the head 16a of the stop screw 16 abutting on the step 14c of the adjustment nut 14, obtaining no upward movement of the adjustment screw 13. The capacitance is adjusted by changing the gross facing area of the movable electrode 10 with respect to the stationary electrode 6 by moving the movable electrode 10 vertically. Vertical movement of the movable electrode 10 is achieved such that when turning the adjustment nut 14 to the right, the adjustment screw 13 is moved downward, whereas when turning it to the left, the adjustment screw 13 is moved upward.

With the vacuum capacitor, since the vacuum vessel 5 is maintained under vacuum therein, the adjustment screw 13 always undergoes an upward pushing force, which also acts on the adjustment nut 14, producing the surface pressure at the flange 12a, leading to great torque required for rotation of the adjustment nut 14. In the illustrative embodiment, arrangement of the bearing 15 allows a reduction in such torque.

As described hereinbefore, the characteristics required of the vacuum variable capacitor are lower power loss, less heat generation during energization, longer life, and the like. The vacuum capacitor comprises bellows 17 which follows the movable electrode 10 to maintain the hermeticity of the inside of the vacuum vessel 5 and which serves as a current path between the movable-electrode support plate 9 and the movable side-end plate 4. Thus, the material of the bellows 17 exerts a great influence on the required characteristics.

Typical materials of the bellows 17 include a copper material such as phosphor bronze or beryllium copper and a stainless-steel material as copper plated. The two materials have own advantage and drawback, and thus could not have met the required characteristics of enhanced energization ability and increased life at the same time. By way of example, though longer in life than the copper bellows, the stainless-steel bellows is inferior to the copper bellows in heat generation during energization, causing heat generation during energization in an inevitable way. The conductivity (intrinsic conductivity ratio) of the phosphor-bronze bellows is about 10% IACS (International Annealed Copper Standard), and the conductivity of the beryllium-copper bellows is about 22% IACS or 48% IACS.

A power loss and heat generation at the bellows are reduced by adopting a material having higher conductivity. The material should have not only higher conductivity, but also longer life. Moreover, since the bellows is brazed at high temperature (about 700° C. or more) in a vacuum, the material should resist such high brazing temperature and show excellent strength after brazing.

In the illustrative embodiment, the bellows 17 is formed of a conduction high-strength heat resisting alloy of TAMAC194, manufactured by MITSUBISHI SINDOH CO., LTD. TAMAC194 has about 68% IACS conductivity, and contains as typical chemical components 97.0 or more weight % Cu, 2.1–2.6 weight % Fe, 0.05–0.20 weight % Zn, and 0.015–0.15 weight % P.

Figure 2:
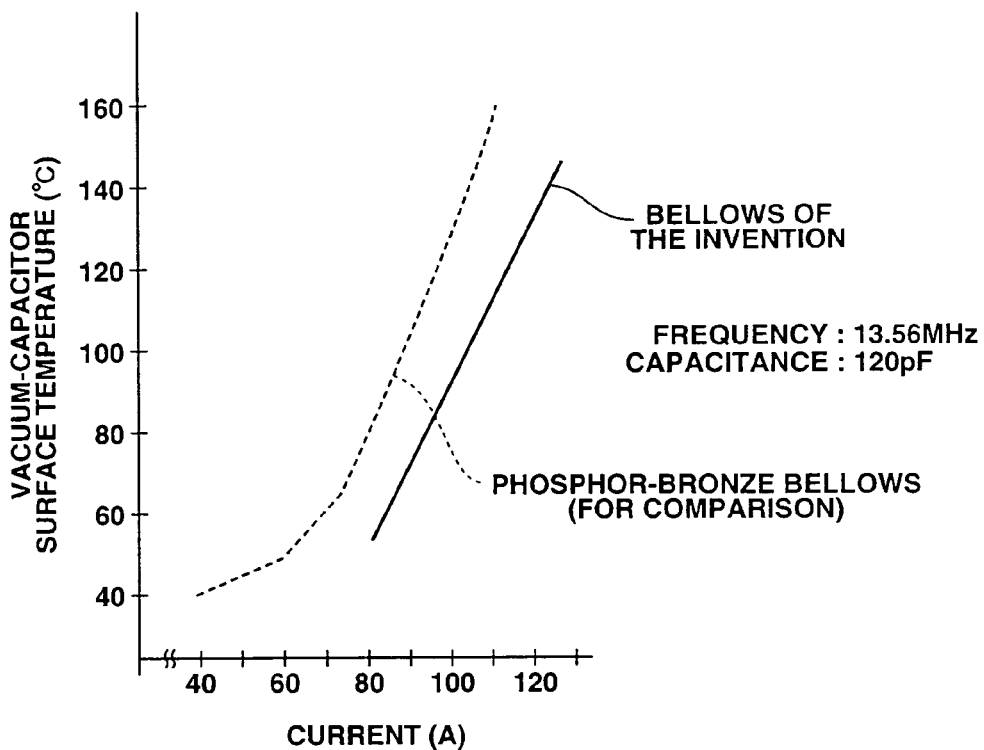
FIG. 2 is a graph showing the current surface temperature characteristics of the vacuum capacitors.

FIG. 2 is a graph showing the current surface temperature characteristics of the vacuum capacitors, wherein a solid line shows a characteristic given by the bellows 17 of the present invention, and a broken line shows a characteristic given by the typical phosphor-bronze bellows as a comparative example. The characteristics are obtained by setting the capacitance of the vacuum capacitors at 120 pF, and the frequency of current at 13.56 MHz. As is apparent from FIG. 2, the bellows 17 of the present invention has lower vacuum-capacitor surface temperature, less power loss, and less heat generation when compared with the phosphor-bronze bellows.

Figure 3:
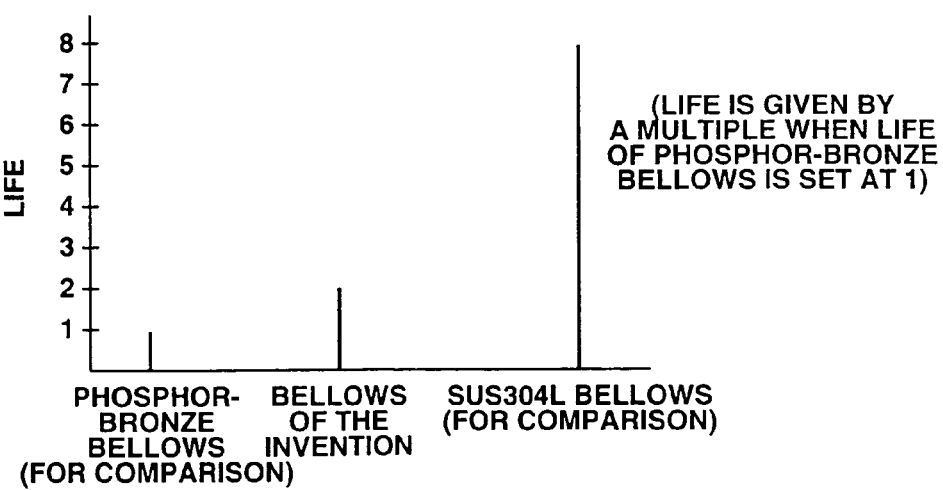
FIG. 3 is a graph similar to FIG. 2, showing material life characteristics of the bellows.

FIG. 3 is a graph showing material life characteristics of the bellows, wherein the characteristic of the bellows 17 of the present invention is shown in comparison with the typical phosphor-bronze bellows and SUS304L bellows as comparative examples, wherein the life is given by a multiple when the life of the phosphor-bronze bellows is set at 1. As is apparent from FIG. 3, the bellows 17 of the present invention has shorter life than that of the SUS304L bellows, but several times that of the phosphor-bronze bellows, allowing achievement of longer life.

Moreover, TAMAC194 has mechanical properties of higher tensile strength and modulus of longitudinal elasticity, and thus can resist high brazing temperature, resulting in achievement of longer life.

As described above, in the illustrative embodiment, since the bellows 17 is formed of a conduction high-strength heat resisting alloy of TAMAC194, it shows higher conductivity, allowing restraint in heat generation during energization and thus increase in maximum allowable current value, resulting in achievement of longer life. Moreover, due to its higher tensile strength, TAMAC194 can resist high brazing temperature.

Having described the present invention in connection with the preferred embodiment, it is noted that the present invention is not limited thereto, and various changes and modifications can be made without departing from the scope of the present invention.

The entire teachings of Japanese Patent Application P2003-408853 filed Dec. 8, 2003 are hereby incorporated by reference.

What is claimed is:

1. A vacuum capacitor, comprising:
    a vacuum vessel;
    stationary and movable electrodes arranged in the vacuum vessel; and
    a bellows which follows the movable electrode to maintain hermeticity of an inside of the vacuum vessel, the bellows serving as a current path, the bellows being formed of a conduction high-strength heat resisting alloy, the conduction high-strength heat resisting alloy having 68% IACS conductivity, the conduction high-strength heat resisting alloy comprising 97.0 or more weight % Cu, 2.1–2.6 weight % Fe, 0.05–0.20 weight % Zn, and 0.015–0.15 weight % P.

2. A bellows for use in a vacuum capacitor, wherein the bellows follows a movable electrode to maintain the hermeticity of the inside of a vacuum vessel, the bellows serving as a current path, the bellows comprising:
    a conduction high-strength heat resisting alloy, the conduction high-strength heat resisting alloy having 68% IACS conductivity, the conduction high-strength heat resisting alloy comprising 97.0 or more weight % Cu. 2.1–2.6 weight % Fe, 0.05–0.20 weight % Zn, and 0.015–0.15 weight % P.

* * * * *